No. 790,391. PATENTED MAY 23, 1905.
E. F. PRICE.
PROCESS OF SMELTING METALLIC COMPOUNDS.
APPLICATION FILED AUG. 31, 1904.
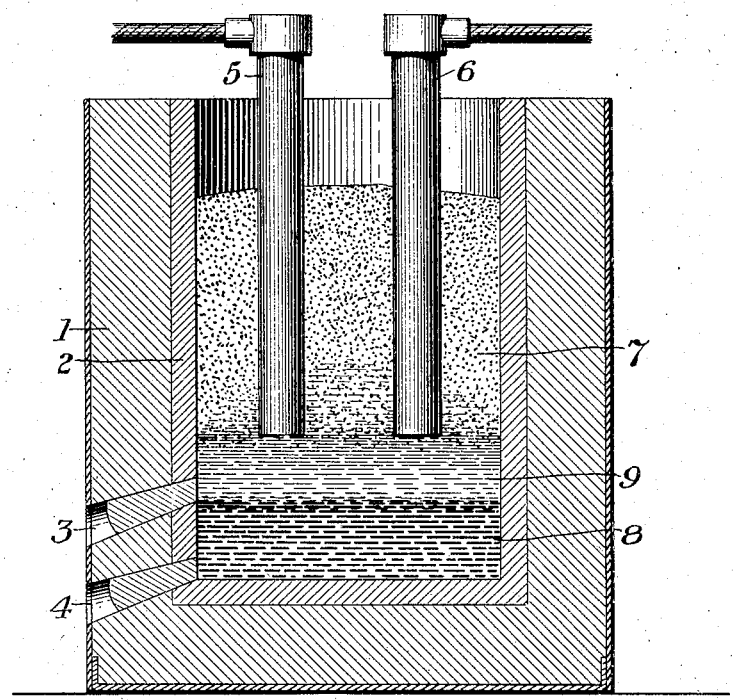
Witnesses:
R A Balduson
Julia B Hill
Inventor:
Edgar F. Price,
by Byrnes & Townsend,
Att'ys.

No. 790,391. Patented May 23, 1905.

UNITED STATES PATENT OFFICE.

EDGAR F. PRICE, OF NIAGARA FALLS, NEW YORK.

PROCESS OF SMELTING METALLIC COMPOUNDS.

SPECIFICATION forming part of Letters Patent No. 790,391, dated May 23, 1905.

Application filed August 31, 1904. Serial No. 222,891.

*To all whom it may concern:*

Be it known that I, EDGAR F. PRICE, a citizen of the United States, residing at Niagara Falls, in the county of Niagara and State of New York, have invented certain new and useful Improvements in Processes of Smelting Metallic Compounds and Producing Ferrochromium, of which the following is a specification.

In the production of ferrochromium from chromite it is customary to introduce a small charge of the ore, carbon, and a flux into an electric furnace having sides and a hearth of carbon and to spring an arc between the hearth and a depending carbon electrode having its lower end embedded in the charge. The potential difference usually maintained between the terminals of the furnace is one hundred and ten volts. As the ore is reduced a layer of the ferrochromium accumulates on the hearth, covered by a layer of slag. The molten alloy is tapped out from time to time until the slag has increased to such an amount as to require removal. As the normal slag has a high fusion-point, a flux is added to render it more liquid, and the remaining alloy and slag are finally run out through the metal tap-hole. The furnace is then charged anew and the process is repeated. It is important that the ferrochromium produced should be low in carbon. The amount of carbon in the charge is therefore kept at a minimum. On account of the low percentage of admixed carbon, however, highly-oxidizing gases are evolved in contact with the depending electrode, which is soon consumed and must be replaced. The air also acts rapidly on the hot electrode when the furnace is emptied by the removal of slag. Since the charge is a fairly good conductor of electricity, a thin layer only is maintained around the lower end of the depending electrode to prevent excessive shunting of current to the carbon sides of the furnace under the high applied potential. Much heat is therefore lost by radiation from the zone of reduction through the charge, while the electrode is insufficiently protected from oxidation by the air. This loss of heat greatly decreases the reduction efficiency of the furnace. Furthermore, the slag is not kept at a sufficiently high temperature to permit it to be tapped out, except by adding large amounts of flux, discontinuing the charging of ore, and employing the energy of the arc merely to liquefy the slag. The heat losses are also increased by the discontinuous mode of working, both the furnace and the depending electrodes cooling down when the furnace is emptied. It is also impracticable to effect a clean separation of the metal and slag by removing them successively through a single tap-hole.

According to the present invention the production of ferrochromium and similar alloys from an electrically-conductive charge is effected by a continuous operation. The alloy and slag may be tapped from the furnace at different levels, a considerable body of the charge being maintained around electrodes which depend into the furnace and a minimum voltage being applied to the electrodes.

A suitable electric furnace is shown in the accompanying drawing, in which the figure is a vertical axial section through the tap-holes with the electrodes in elevation.

The furnace comprises a body 1, of firebrick or masonry, with a refractory lining 2, of magnesite, siloxicon, or carbon. Lateral tap-holes 3 4 for slag and metal, respectively, extend from the lower part of the furnace-chamber. The electrodes 5 6 of opposite polarity (shown as carbon rods) depend into the furnace. In employing this furnace to carry out the process an arc is established between the electrodes or each electrode and the carbon lining 2, if used, and a small amount of the charge—for example, a mixture of chromite, coke, lime, and silica—is fed into the bottom of the furnace. The furnace is then gradually filled until in its normal working condition the electrodes are embedded in the charge 7, as illustrated. The minimum voltage is applied to the electrodes to largely prevent the electric current from shunting through the charge. As the iron and chromium are reduced a layer 8 of the molten alloy collects in the bottom of the furnace and may be removed from time to time through the tap-hole 4. When a considerable layer 9 of slag collects upon the metal, it may be removed through the tap-hole 3. In some cases the violent ebullition in the furnace prevents the stratification or clean separation of the metal and slag. They are then preferably both withdrawn through the lower tap-hole and separated in a settling-pot.

It will be seen that the deep body of the charge 7 surrounding the electrodes effectively retains the heat within the furnace, both increasing the production of metal and maintaining the slag in a molten condition without especial attention. The use of this deep body is made possible by and necessitates the employment of a minimum electromotive force, since the voltage usually employed in furnaces of this character would cause excessive waste of current by shunting or short-circuiting through the charge if no current-regulator were employed, a commercially-impracticable mode of procedure, or would lift the electrodes partially out of the charge if controlled by a constant-current regulator, thus raising the zone of maximum temperature to the upper part of the furnace and causing excessive heat losses by radiation from the charge, excessive oxidation of the hot exposed surfaces of the electrodes, and loss of a portion of the finely-divided charge by the gases blowing violently out from the zone of reduction. The furnace is operated continuously, the metal and slag being drawn off and fresh materials added as required. The hot surfaces of the electrodes and furnace-lining are therefore never exposed to the oxidizing and cooling action of the atmosphere. A clean separation between the metal and slag is usually effected by tapping them out at different levels and always leaving a certain amount of each within the furnace.

While the furnace shown employs two depending electrodes of opposite polarity, it is obvious that the process may be carried out by the use of a furnace in which the hearth-surface is one electrode, the arc being sprung between the hearth and a single depending electrode.

The process has been described in connection with the reduction of chromite, but is applicable to the treatment of any refractory electrically-conductive compound of a metal or metals which it is desired to obtain in a state of substantial freedom from carbon or containing a low or definite percentage of carbon. The process is also applicable to the production of alloys from conductive mixtures of ores of two or more metals—for example, ferrosilicon from a mixture of silica and hematite.

I claim—

1. The process of smelting an electrically-conductive charge of a metallic compound, which consists in establishing an electric arc within the charge, surrounding the zone of reduction and protecting the electrodes from the oxidizing and cooling effect of the atmosphere by a considerable body of the charge, and maintaining between the electrodes the minimum potential difference requisite to effect reduction, thereby substantially preventing loss of electric current by leakage through the charge and heat radiation, as set forth.

2. The process of smelting metallic compounds and producing metallic products containing a definite percentage of carbon, which consists in providing an electrically-conductive charge containing a predetermined amount of carbon, establishing an electric arc within the charge, surrounding the zone of reduction and protecting the electrodes from the oxidizing and cooling effect of the atmosphere by a considerable body of the charge, and maintaining between the electrodes the minimum potential difference requisite to effect reduction, thereby substantially preventing loss of electric current by leakage through the charge and heat radiation, as set forth.

3. The process of smelting an electrically-conductive charge of a metallic compound, which consists in establishing an electric arc within the charge, surrounding the zone of reduction and protecting the electrodes from the oxidizing and cooling effect of the atmosphere by a considerable body of the charge, maintaining between the electrodes the minimum potential difference requisite to effect reduction, thereby substantially preventing loss of electric current by leakage through the charge and heat radiation, and tapping the reduced metal and slag from the furnace, as set forth.

4. The process of smelting an electrically-conductive charge of a metallic compound, which consists in establishing an electric arc within the charge, surrounding the zone of reduction and protecting the electrodes from the oxidizing and cooling effect of the atmosphere by a considerable body of the charge, maintaining between the electrodes the minimum potential difference requisite to effect reduction, thereby substantially preventing loss of electric current by leakage through the charge, and tapping the reduced metal and slag from the furnace at different levels, as set forth.

5. The process of smelting an electrically-conductive charge of a metallic compound containing iron, which consists in establishing an electric arc within the charge, surrounding the zone of reduction and protecting the electrodes from the oxidizing and cooling effect of the atmosphere by a considerable body of the charge, and maintaining between the electrodes the minimum potential difference requisite to effect reduction, thereby substantially preventing loss of electric current by leakage through the charge and heat radiation, as set forth.

6. The process of smelting metallic compounds containing iron and producing a product containing a definite percentage of carbon, which consists in providing an electrically-conductive charge containing a predetermined amount of carbon, establishing an electric arc within the charge, surrounding the zone of reduction and protecting the electrodes from the oxidizing and cooling effect of the atmosphere by a considerable body of the charge, and maintaining between the electrodes the minimum potential difference requisite to effect reduction, thereby substantially preventing loss of electric current by leakage through the charge and heat radiation, as set forth.

7. The process of smelting an electrically-conductive charge of a metallic compound containing iron, which consists in establishing an electric arc within the charge, surrounding the zone of reduction and protecting the electrodes from the oxidizing and cooling effect of the atmosphere by a considerable body of the charge, maintaining between the electrodes the minimum potential difference requisite to effect reduction, thereby substantially preventing loss of electric current by leakage through the charge and heat radiation, and tapping the reduced metal and slag from the furnace, as set forth.

8. The process of smelting an electrically-conductive charge of a metallic compound containing iron, which consists in establishing an electric arc within the charge, surrounding the zone of reduction and protecting the electrodes from the oxidizing and cooling effect of the atmosphere by a considerable body of the charge, maintaining between the electrodes the minimum potential difference requisite to effect reduction, thereby substantially preventing loss of electric current by leakage through the charge, and tapping the reduced metal and slag from the furnace at different levels, as set forth.

9. The process of smelting an electrically-conductive charge of a metallic compound containing iron and chromium, which consists in establishing an electric arc within the charge, surrounding the zone of reduction and protecting the electrodes from the oxidizing and cooling effect of the atmosphere by a considerable body of the charge, and maintaining between the electrodes the minimum potential difference requisite to effect reduction, thereby substantially preventing loss of electric current by leakage through the charge and heat radiation, as set forth.

10. The process of smelting a metallic compound or compounds containing iron and chromium and producing ferrochromium containing a definite percentage of carbon, which consists in providing an electrically-conductive charge containing a predetermined amount of carbon, establishing an electric arc within the charge, surrounding the zone of reduction and protecting the electrodes from the oxidizing and cooling effect of the atmosphere by a considerable body of the charge, and maintaining between the electrodes the minimum potential difference requisite to effect reduction, thereby substantially preventing loss of electric current by leakage through the charge and heat radiation, as set forth.

11. The process of smelting an electrically-conductive charge of a metallic compound containing iron and chromium, which consists in establishing an electric arc within the charge, surrounding the zone of reduction and protecting the electrodes from the oxidizing and cooling effect of the atmosphere by a considerable body of the charge, maintaining between the electrodes the minimum potential difference requisite to effect reduction, thereby substantially preventing loss of electric current by leakage through the charge, and tapping the alloy and slag from the furnace, as set forth.

12. The process of smelting an electrically-conductive charge of a metallic compound containing iron and chromium, which consists in establishing an electric arc within the charge, surrounding the zone of reduction and protecting the electrodes from the oxidizing and cooling effect of the atmosphere by a considerable body of the charge, maintaining between the electrodes the minimum potential difference requisite to effect reduction, thereby substantially preventing loss of electric current by leakage through the charge, and tapping the alloy and slag from the furnace at different levels, as set forth.

In testimony whereof I affix my signature in presence of two witnesses.

EDGAR F. PRICE.

Witnesses:
HARRY L. NOYES,
F. B. O'CONNOR.